United States Patent [19]

Margeson, III et al.

[11] Patent Number: 5,448,257
[45] Date of Patent: Sep. 5, 1995

[54] FRAME BUFFER WITH MATCHED FRAME RATE

[75] Inventors: James E. Margeson, III, Santa Clara; Ignatius B. Tjandrasuwita, Union City, both of Calif.

[73] Assignee: Chips and Technologies, Inc., San Jose, Calif.

[21] Appl. No.: 732,082

[22] Filed: Jul. 18, 1991

[51] Int. Cl.⁶ .................................. G09G 5/00
[52] U.S. Cl. .................................. 345/3; 345/103; 345/201
[58] Field of Search ............. 340/784, 720, 799, 716, 340/750, 747, 703; 358/140, 22; 345/3, 103, 189, 190, 196, 197, 200, 203, 201

[56] References Cited

U.S. PATENT DOCUMENTS

| | | | |
|---|---|---|---|
| 4,074,254 | 2/1978 | Belser et al. | 340/799 |
| 4,418,344 | 11/1983 | Brown | 340/750 |
| 4,630,234 | 12/1986 | Holly | 340/703 X |
| 4,679,038 | 7/1987 | Bantz et al. | 340/747 |
| 4,740,786 | 4/1988 | Smith | 340/784 |
| 4,742,350 | 5/1988 | Ko et al. | 340/799 |
| 4,745,485 | 5/1988 | Iwasaki | 340/784 |
| 4,746,979 | 5/1988 | Kashigi | 358/22 |
| 4,816,816 | 3/1989 | Usui | 340/784 |
| 4,845,473 | 7/1989 | Matsuhashi et al. | 340/784 |
| 4,908,710 | 3/1990 | Wakai et al. | 345/103 |
| 4,954,969 | 9/1990 | Tsumura | 340/799 |
| 5,047,760 | 9/1991 | Trevelt et al. | 340/799 |
| 5,081,076 | 5/1991 | Johary et al. | 340/716 X |
| 5,133,062 | 6/1992 | Joshi et al. | 340/799 X |
| 5,170,157 | 12/1992 | Ishii | 340/799 |

*Primary Examiner*—Tommy P. Chin
*Assistant Examiner*—Kara A. Farnandez
*Attorney, Agent, or Firm*—Benman Collins & Sawyer

[57] ABSTRACT

A frame buffer architecture for a graphics controller provides for conversion of cathode ray tube (CRT) data streams to multi-segment data streams. The buffer architecture operates such that the CRT frame rate is the same as the multi-segment frame rate. In so doing, a graphics controller can operate within its intended specification while operating at the same clock frequency whether in CRT or multi-segment mode. In addition, this architecture overcomes the other problems associated with prior art graphics controllers.

4 Claims, 7 Drawing Sheets

| | | | | | | | | | | | |
|---|---|---|---|---|---|---|---|---|---|---|---|
| A | CRT DATA STREAM (LINE NUMBERS) | 0 | 1 | 2 | 3 | 4 | 5 | 6 | 7 | 8 | 9 | 0 |
| B | PANEL DATA STREAM | 0 | 5 | 1 | 6 | 2 | 7 | 3 | 2 | 4 | 9 | 0 |
| C | CONTENTS OF UPPER PANEL FIFO | | 1 | 2 2 | 2 3 3 | 3 4 4 | 4 | | | | | |
| D | CONTENTS OF LOWER PANEL FIFO | 5 6 7 8 9 | 6 7 8 9 | 6 7 8 9 | 7 8 9 | 7 8 9 | 8 9 | 5 6 8 9 | 5 6 7 9 | 5 6 7 8 9 | 5 6 7 8 9 | |
| E | NUMBER OF LINES STORED | 5 | 5 | 5 | 5 | 5 | 5 | 5 | 5 | 5 | 5 | 5 |

| LINE WRITTEN | LINE READ |
|---|---|
| 0 | 0 |
| 1 | 5 |
| 2 | 1 |
| 3 | 6 |
| 4 | 2 |
| 5 | 7 |
| 6 | 3 |
| 7 | 8 |
| 8 | 4 |
| 9 | 9 |
| 0 | 0 | bc 5 → 6 → 7 → 8 → 9 bc bp 5 → 6 → 7 → 8 → 9 bc 1 ↺    bp 6 → 7 → 8 → 9 bc 2 → bp 6 → 7 → 8 → 9 bc 2 ⇄ 3    bp 7 → 8 → 9 bc 3 → 4 → bp 7 → 8 → 9 bc 3 → 4 → 5    bp 8 → 9 bc 4 → 5 → 6 → bp 8 → 9 bc 4 → 5 → 6 → 7    bp 9 bc 5 → 6 → 7 → 8 → bp 9 bc 5 → 6 → 7 → 8 → 9 bc
bp 5 → 6 → 7 → 8 → 9

FIGURE 5

| | | a | nbp | nbc | nlink | d_s | d_out |
|---|---|---|---|---|---|---|---|
| 9<br>INIT STATE | bc<br>5→6→7→8→9→X | 1 | | bc | | Buf | 9 |
| 0 | bc bp  NO DRAM ACCESS<br>5→6→7→8→9→X | - | bc | bc | - | CRT | 0 |
| 1 | bc    bp<br>1→6→7→8→9→X | bp | link | bc | bc | Buf | 5 |
| 2 | bc    bp<br>2→6→7→8→9→X | bc | bp | link | bp | Buf | 1 |
| 3 | bc        bp<br>2⇌3    7→8→9→X | bp | link | bc | bc | Buf | 6 |
| 4 | bc  bp<br>4←3  7→8→9→X | bc | bp | link | bp | Buf | 2 |
| 5 | bc    bp<br>4←3←5  →8→9→X | bp | link | bc | bc | Buf | 7 |
| 6 | bc        bp<br>4  6←5  8→9→X | bc | bp | link | bp | Buf | 3 |
| 7 | bc            bp<br>4  6←5  7  9→X | bp | link | bc | bc | Buf | 8 |
| 8 | bc    bp<br>8  6←5  7  9→X | bc | bp | link | bp | Buf | 4 |
| 9 | bp    bc<br>8  6←5  7    9→X | bp | link | bc | bc | Buf | 9 |
| 0 | NO DRAM ACCESS<br>bc bp | - | bc | bc | - | CRT | 0 |

FRAME BUFFER WITH MATCHED FRAME RATE

FIELD OF THE INVENTION

The present invention relates to an apparatus for converting cathode ray tube (CRT) data streams to multi-segment data streams and, more particularly, to an apparatus for providing for a method for using a frame buffer to implement the same.

BACKGROUND OF THE INVENTION

It is well known that it is important to convert cathode ray tube (CRT) data streams into multi-segment data streams when displaying graphics data on a multi-segment display. A CRT display controller produces a data stream that begins with the top line to be displayed and outputs successive lines until the bottom frame is reached. However, displays that utilize multiple segments require input data in a different order than the CRT displays because all of the segments are refreshed simultaneously.

More particularly, data to refresh these display segments are often output in a parallel manner rather than in the sequential manner associated with CRT displays. In such multiple segment display systems multiple streams of data are required, one stream per display segment. During the active video portion of the frame, one line in each segment is driven. At the start of the refresh frame, the data for the first line of each segment is output to that segment. When that line is completed, the next line of each segment is output. Successive lines are sent to the display segments until the end of the longest segment is reached.

A technique that has been utilized to produce multiple data streams is to alter the order that the data is read from the display image buffer that is part of the personal computer. This type of system is disclosed in U.S. Pat. No. 5,018,076, entitled, "Method and Circuitry for Dual Panel Displays," and assigned to assignee of the present application. Although this type of system works satisfactorily in many applications, there are some disadvantages:

(1) If the display controller also interfaces to a CRT, then it must be able to function in either mode, requiring a larger, more complicated controller implementation in the CRT application.

(2) If the controller must generate data streams for the CRT and multi-segment displays simultaneously, the data streams must be read from the display image buffer independently, requiring approximately twice the data bandwidth from the buffer.

(3) Reading data from multiple segments of the display image buffer results in a non-contiguous address order, preventing use of DRAM page mode techniques commonly implemented to increase memory bandwidth.

Another technique is to use plurality of FIFO's to create delayed versions of the data stream as described in U.S. Pat. No. 4,816,816 entitled "Liquid Crystal Display Apparatus," assigned to Casio; and in PCT International Patent Application number WO 90/12389 assigned to Cirrus Logic, Inc., entitled, "Converter for Raster Image Data from Single Segment to Multi-Segment Streams." As has been before mentioned, some prior art systems for converting CRT data streams to multi-segment data streams have required altering the order that data is read from a display image buffer. This technique is presently being utilized in several existing products. As has also been before mentioned, this technique has the following disadvantages. If the controller must interface to a CRT, then the controller must functioning either mode, making it more complicated. If the controller must generate data streams for the CRT and the multi-segment displays simultaneously, the bandwidth of the display image buffer must have twice the data bandwidth. Finally, reading data information from multiple sections of the display buffer prevents use of the DRAM page mode techniques.

Figure 1:
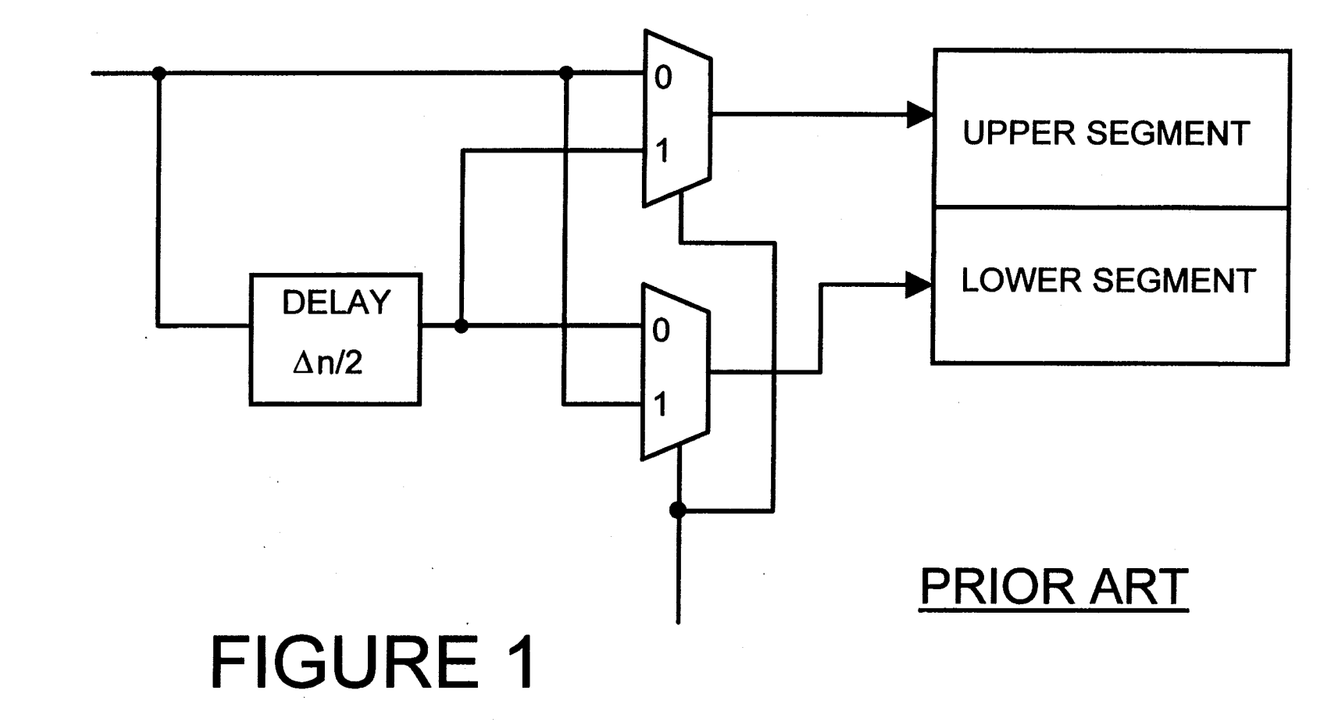
FIG. 1 is a diagram of a prior art half frame buffer scheme.

As has been before mentioned, another prior art technique is disclosed in U.S. Pat. No. 4,816,816 and in PCT International Patent WO 90/12389, that creates delayed versions of the CRT data stream through the use of a particular frame architecture. FIG. 1 shows the architecture used to produce a converted multi-segment data stream.

Referring now to FIG. 1, as is seen, the single stream raster data is supplied to the upper segment of the display during the upper half of the CRT frame, and is supplied to the lower segment during the second half of the CRT frame. The single stream raster data is also supplied to a FIFO that delays the stream by one half CRT frame. The output data stream from the FIFO is supplied to the lower segment of the display during the first half of the CRT frame, and to the upper segment during the last half. Although this type of system is an improvement over previously known systems, it still has the disadvantage that the frame rate of a multi-segment display is different than that of the CRT format data stream. For example, the frame rate of a dual-segment display would be twice that of the CRT format data stream.

Figure 2:
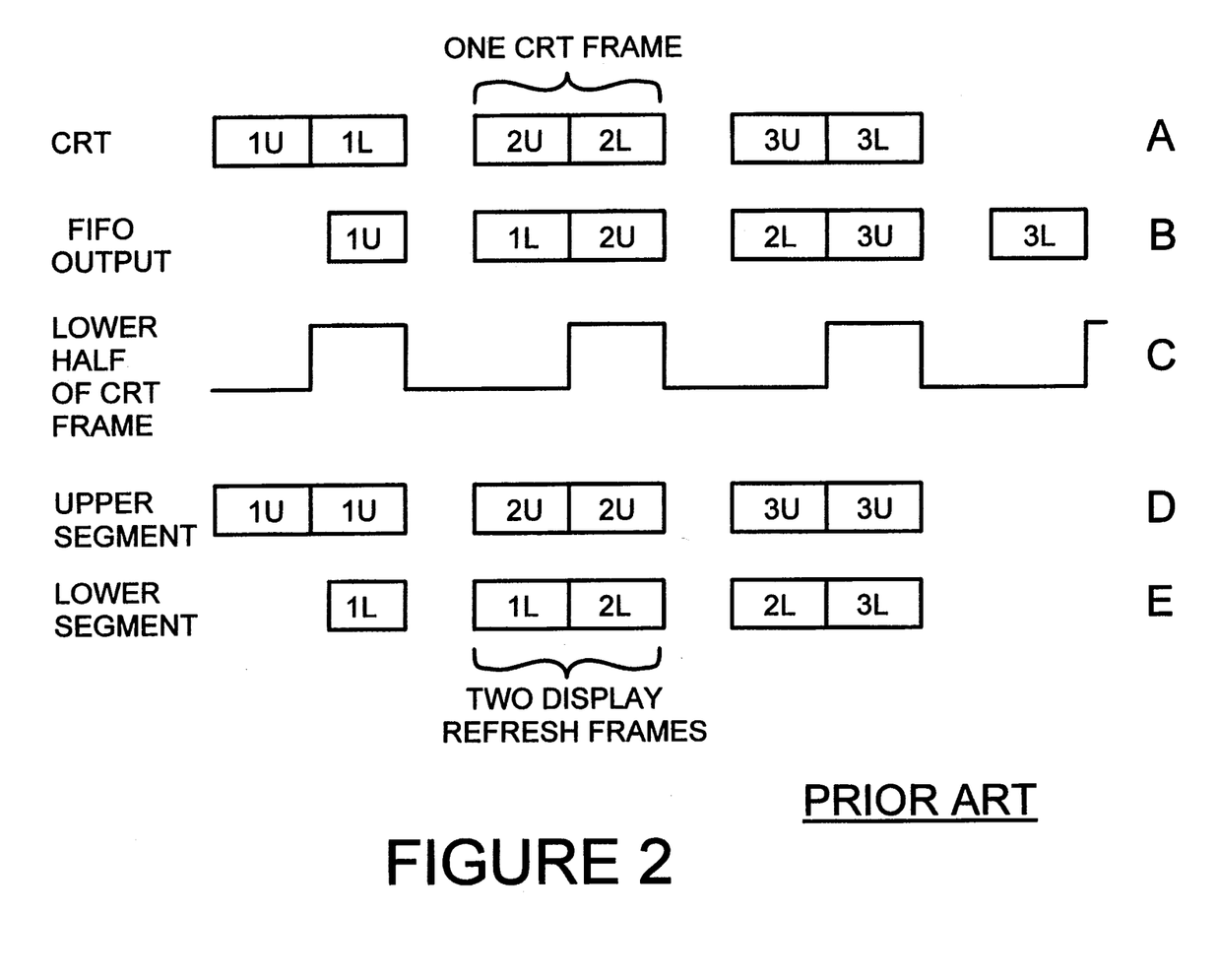
FIG. 2 shows the timing diagram of the data flow of the half frame buffer shown in FIG. 1.

To more fully understand this, refer now to FIG. 2 which is the data flow timing diagram for the architecture shown in FIG. 1. Referring to first line A which is the CRT data stream is provided as shown—that is, first the data stream which represents the upper half of the screen is sent, then the data stream which represents the lower half of the screen; this process is repeated for successive frames. The following line (line B) represents the CRT format data stream delayed one half CRT frame as output from the FIFO. Line C is the control for the two multiplexers in the architecture. Line D shows the data stream that is output to the upper segment of the display. Line E shows the stream that is output to the lower segment. As is noted, the line number of the frame provides the gating function to allow the data stream to either be provided to the upper or lower segment.

As is further seen from the timing diagram, the frame rate of the data to the upper and lower segments are double that of the CRT data stream because the upper and lower segments are each refreshed twice during the period of one CRT refresh frame. Therefore, if it is necessary simultaneously to control a CRT display and a dual segment display, the resulting frame rate can be too high. An example of such a situation is an LCD dual-panel, which is commonly used to display VGA graphics images. The CRT frame rates is generally 60 Hz which would then result in a frame rate for the LCD panel of 120 Hz. Oftentimes, the LCD panel may only operate effectively at the refresh rate of 60 Hz, or the CRT frame rate.

These systems have the disadvantage that the frame rate of the dual segment display data stream is twice that of the CRT format data stream. When simultaneously controlling a CRT display and a dual segment display, the resulting frame rate for the dual segment display is usually higher than display specifications allow. Hence, what is needed is a system for converting CRT data streams into multi-segment data streams while not having the above mentioned disadvantages. The present invention provides such a system.

SUMMARY OF THE INVENTION

The present invention is an apparatus for converting a cathode ray tube (CRT) data stream to multiple data streams, each one of the multiple data streams corresponding to one segment of a display, such that the display rate of each segment of the display is equal to that of the CRT data stream. The apparatus comprises a means for separating the CRT data stream into multiple data streams containing the data required to refresh the corresponding segment in the display; and a plurality of First-In First-Out register means for receiving and storing the multiple data streams, each FIFO register means containing one stream of the multiple data streams.

Through the use of this apparatus the frame rate for a multi-segment display is equal to the CRT display, thereby allowing for a graphics controller to operate within its intended specification. In addition, this controller does not have any of the above-mentioned disadvantages of the prior art controller graphics.

DETAILED DESCRIPTION OF THE DRAWINGS

The present invention relates to an improvement in the conversion of a cathode ray tube (CRT) display data stream to a multi-segment data stream to be utilized. The following description is presented to enable one of ordinary skill in the art to make and use the invention as provided in the context of a patent application and its requirements. Various modifications to the preferred embodiment will be readily apparent to those of ordinary skill in the art and the generic principles defined herein may be applied to the embodiments. Thus, the present invention is not intended to be limited to the refinement shown but is to be accorded the widest scope consistent with the principles and novel features described herein.

Hence, the present invention overcomes the above-mentioned problem by providing a half frame buffer apparatus with a matched frame rate. The apparatus provides for a sorting means for dividing the CRT data stream into a plurality of data streams and memory array which includes a plurality of FIFOs which size remains a constant one-half frame.

The present invention further provides for a means for reading a line of the multi-segment data stream from the memory array, and then writing from the CRT data stream to the same location in the memory array of the previously read line. In so doing, the frame rate of the CRT data stream and the multi-segment data is the same.

Figure 3:
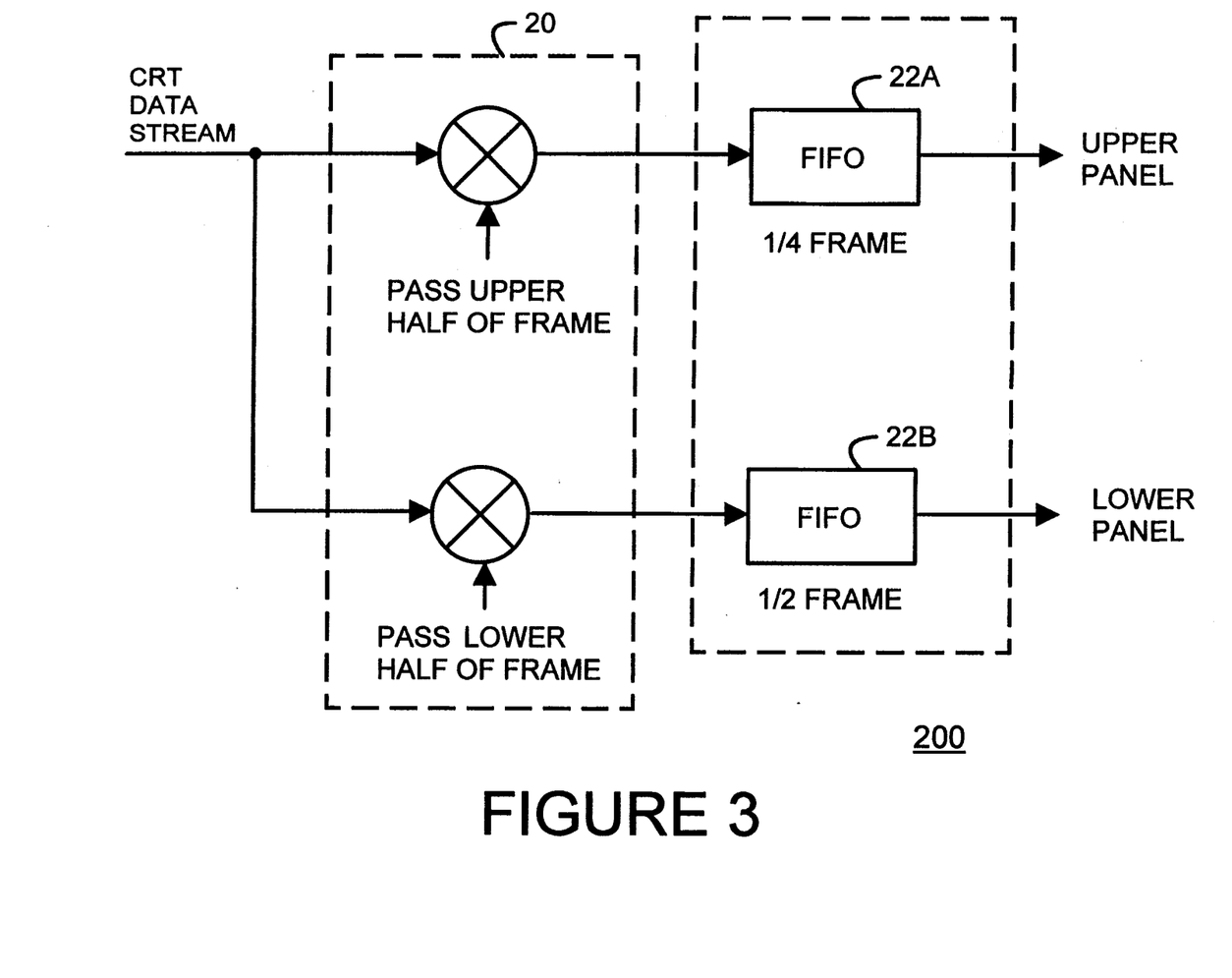
FIG. 3 shows an architecture for converting cathode ray tube (CRT) format data stream to a data stream for input to a dual segment display in accordance with the present invention.

To more fully explain the present invention, refer now to FIG. 3, which is an architectural representation of the half frame buffer with matched frame rate in accordance with the present invention. The apparatus 200 comprises a memory array 22 and a sorting means 20 for dividing the data stream into upper and lower segments. A dual segment display is depicted for illustrative purposes only. One of ordinary skill in the art will recognize that there can be any number of segments and their use would be within the spirit and scope of the present invention.

For purposes of discussion, at the beginning of each frame, the upper FIFO 22a is empty; the lower FIFO 22b contains the data for the entire lower half of the previous frame. Each line of data from the CRT data stream is sent to one of the FIFOs 22a and 22b, and is held until it is output to a display (not shown).

This technique has the following advantages over prior art systems: the controller need only generate a CRT format data stream and the frame refresh rate of the multi-segment display is equal to that of the CRT data stream. Typically, the storage element that is utilized is a memory array. As is seen in FIG. 3, two FIFOs 22a and 22b are utilized to store the separate streams of that segment data.

Figure 4:
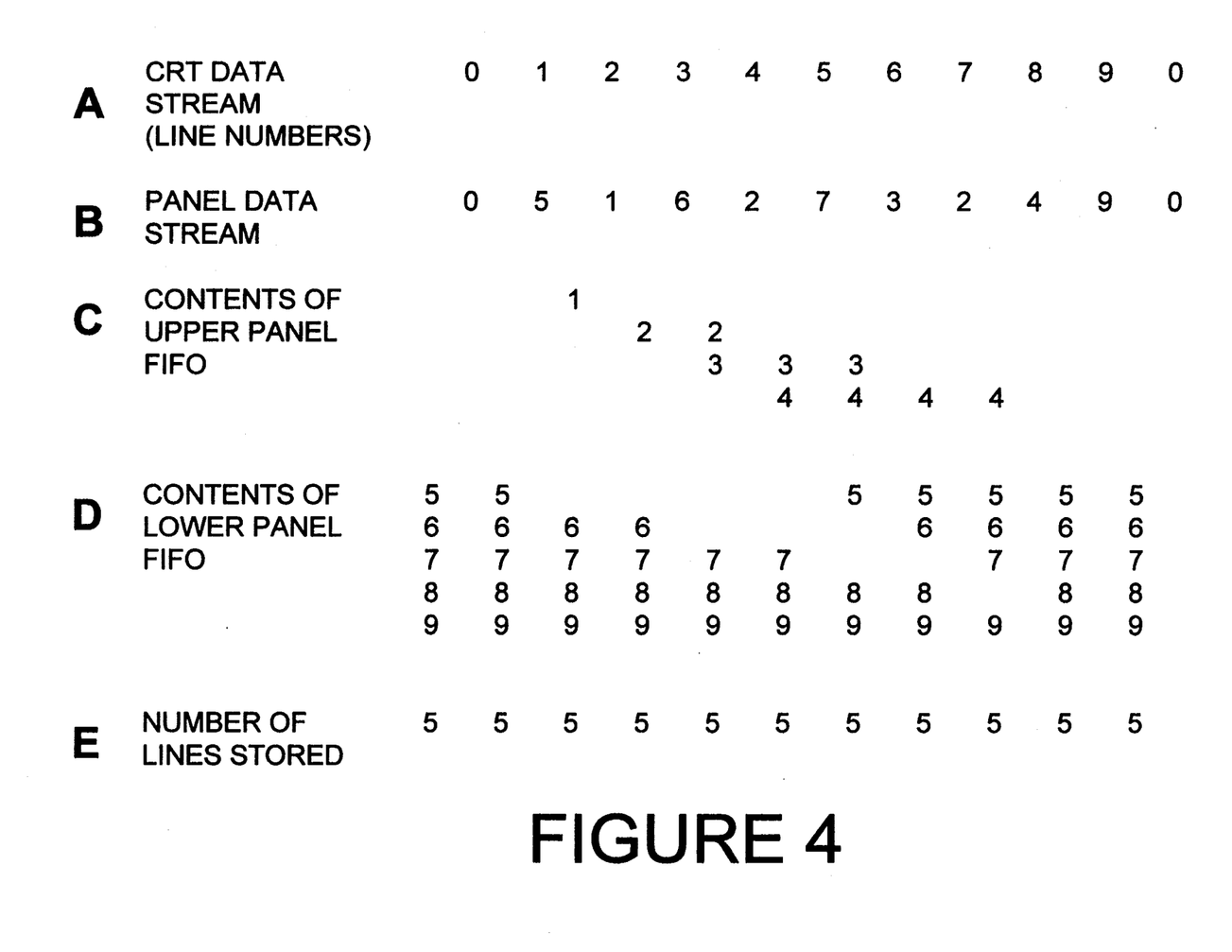
FIG. 4 is a timing diagram of the data flow of the architecture in accordance with the present invention.

Referring now to FIG. 4, what is shown is a conceptual representation of ten lines of information as it first comes to CRT (A), after the data is put in order for the panel (B), and how it is stored in each of the FIFOS (C and D). In this embodiment, since ten lines equal one frame of information, both FIFOs 22a and 22b will always be one half frame or five lines of information. Although the total number of lines (E) is always five, each of the FIFOs 22a and 22b change depth as is shown, and elements of the array must be allocated to either FIFO, as needed. To store these elements sequentially in the FIFOs 22a and 22b, the elements must be shifted as new elements are added and deleted, requiring a large quantity of memory accesses to the FIFOs.

Hence, what is required is a structure to limit the number of memory accesses and also to more efficiently implement the memory array as shown in FIG. 3. To avoid shifting lists of elements, as one implementation, a linked list data structure is utilized.

Figure 5:
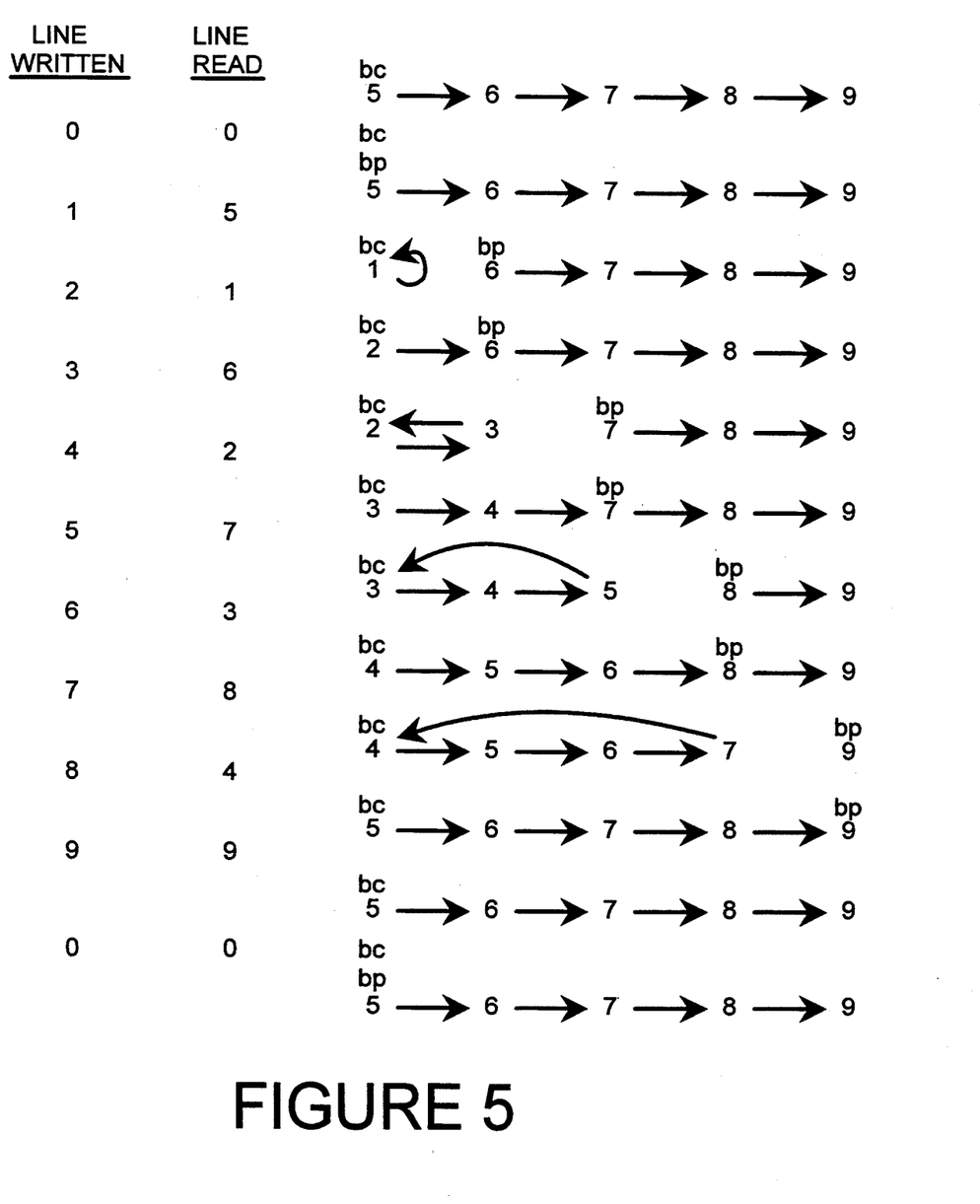
FIG. 5 is a conceptual expression of the data structure over one frame time for a 10-line display in accordance with the present invention.
Figure 6:
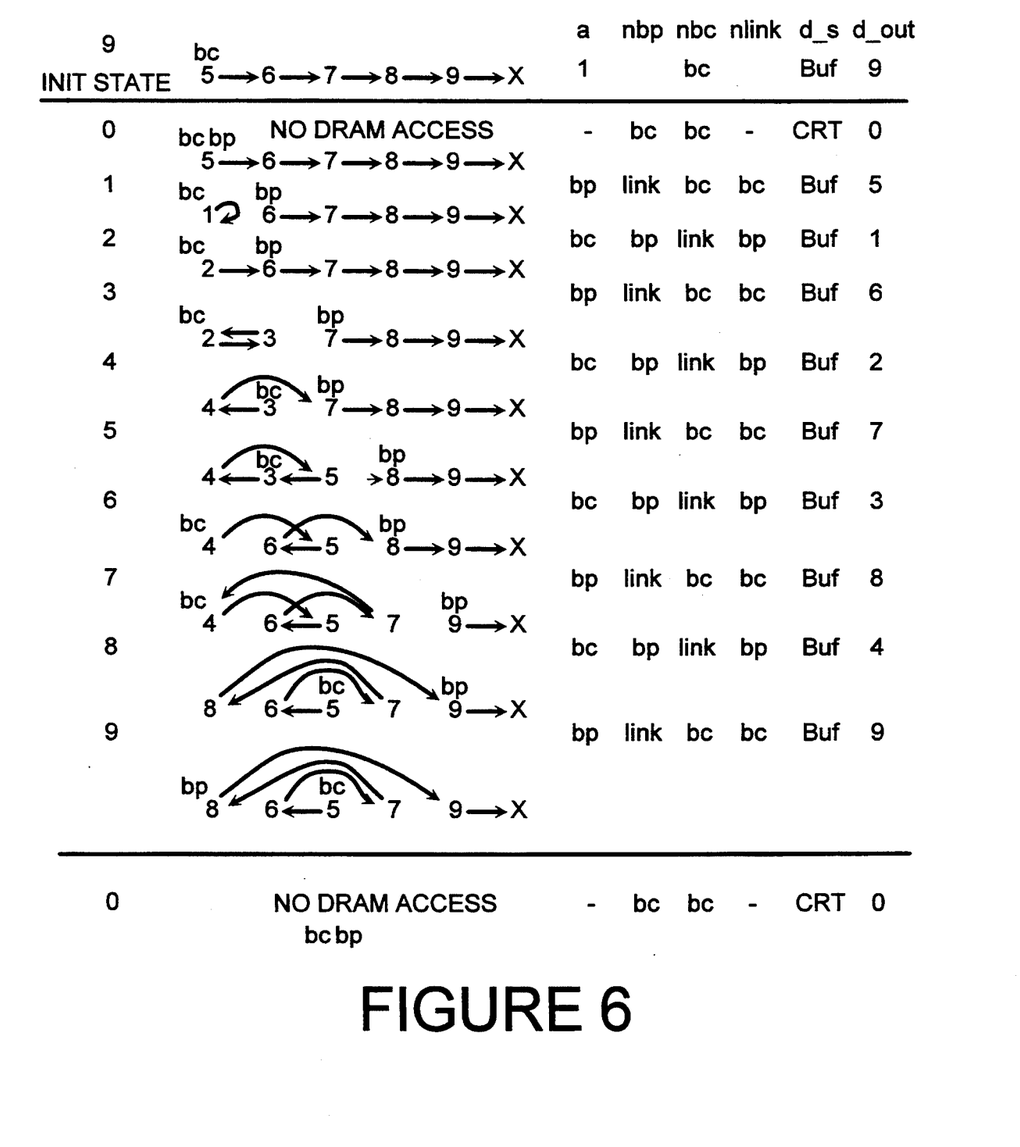
FIG. 6 shows the data structure as it resides in the memory array over the same period in accordance with the present invention.

To more fully understand the use of a linked list data structure, refer now to FIGS. 5 and 6. FIG. 5 shows the conceptual expression of a linked list structure over one frame time for a ten line display. FIG. 6 shows the linked list structure as it resides in the memory array over the same period as shown in FIG. 5, as well as the parameters that are needed to control the data structure.

Referring now to FIG. 5, the overall goal is to write the next line into the same location that the previous line was read from. Initially, an assumption is made that for a ten line frame lines 5–9 ($\frac{1}{2}$ frame of data) from the previous frame are stored in the upper lower FIFO. During the first line period, line 0 is effectively written to and simultaneously read from the upper FIFO, requiring no storage in the memory, and thus no memory accesses.

When line 5 is read out of the lower FIFO, line 1 from the present frame is stored into the upper FIFO. The next line period, line 1 is read out of the upper FIFO, and line 2 is written into the upper FIFO. In the next period, line 6 is read out of the lower FIFO and line 3 is written into the upper FIFO. Thereafter, line 2 is read out of the upper panel FIFO and line 4 is written into the upper panel FIFO.

This procedure continues, as shown in FIG. 5, until a ten line frame of data information is provided to a display. Note that the last half of the CRT frame (lines 5-9) is contained in the lower FIFO and the upper FIFO is empty at the end of the frame, the same as at the beginning of the frame. As has been before noted, this is accomplished with only a half frame of data being stored at any one time.

Referring now to FIG. 6, it is shown that for each line period, one line is read and one line is written, both at the same line address. Hence, what is shown is a linked list data structure which moves the various lines from the FIFOs to the displays. In the embodiment shown, the asterisk shows the memory location that is read from and written to with the various lines. As has been before mentioned, for the first line (0) no DRAM access is necessary because this line is being provided from the CRT data stream.

The next line (5) is read out of the FIFO and line 1 is written into the FIFO at the same memory location. Line 1 is then read out of the memory location to the display and line 2 is written into memory and a link is established between line 2 and line 6 as shown. Line 6 is read to the display and line 3 is written to the memory. The link is then made from line 3 back to line 2. This operation is continued. Through the use of a linked list structure, there is a need to use only two pointers to the total memory rather than having one pointer for each memory location.

The links are stored in the memory because storing them in the controller would increase its complexity and cost. The link associated with each line of data is stored in the memory along with that line of data. Since they are stored together, circuitry to generate a separate address is not needed, and page-mode techniques can be used to reduce memory access time.

The pointers and data structure in the memory require initialization. They are initialized when operation is started, and must be re-initialized so that proper operation can be resumed if any link or pointer is corrupted. The pointers and data structure are initialized during the last half of the first frame to the state shown at the beginning of FIG. 6. However, the sequence in memory of the lines is always different at the end of the frame than at the beginning.

One method to correct the data structure for potential corruption is to initialize it periodically. After a certain number of frames, the order of the lines stored in memory returns to the initialized state. The period of this cycle is dependent on the total number of lines in the display and can be determined by hand calculation, or, more practically, by a simulation program. Initialization can be done at this interval so that normal operation is not disturbed.

If operation has been disturbed, then it is restored by the initialization. Otherwise, the initialization does not change the sequence of events because they are the same as would normally occur. Initialization must occur during the frame that the operation has been disturbed because if it happened at any other frame, the data structure would be altered and the previously stored data would be corrupted. Periodic initialization may wait many frames before the initialization occurs.

A second method to ensure integrity of the data structure is to store a unique signature in memory with each line of data, and check the signature when the data is read. A line count can be used as the signature: (0, 1,2,3 ... N-1), where N is the number of lines in a CRT frame. The signatures read with the data lines are checked and should be equal to: (0, N/2, 1, N/2+1, 2 . . . N/2-1, N-1). If an incorrect signature is detected, initialization is done during the last half of the following CRT frame.

Conditions for generating a nlink, bp and bc force the initialization sequence when required.

---

Two pointers are used to reference the linked lists:
bp: points to the beginning of the data list from the prevous frame, and also points to where lines from the current input data stream are to be stored;
bc: points to the beginning of the data list from the current frame.
The following parameters are generated for each line access:
a: memory address to be accessed,
nlink: new link, written with the data line, calculated by:
    if initialize then
        a = line count − number of lines in display/2
        nlink = line count − number of lines in
            display/2 + 1
    else if (line is even) then
        a = bc
        nlink = bp
    else (line is odd)
        a = bp
        nlink = bc
nbp: next bp,
nbc: next bc,
    Calculated by:
    if initialize then
        nbp = 0
        nbc = 0
    else if (first line) then
        nbp = bc
        nbc = bc
    else if (even line) then
        nbp = bp
        nbc = link read from memory
    else (line is odd)
        nbp = link read from memory
        nbc = bc
ds: data source for output
    calculated by:
    if (first line)
        output the line from the input data stream
    else
        output the line fetched from memory
        address a, store line from input data
        stream with new link at same address.

---

One property of this implementation is that the upper and lower segment data lines are output alternately, not simultaneously. Some displays can accept the lines alternately, but most require them simultaneously. The data for each pair of lines can be buffered after it is read from the FIFOs, then output simultaneously to the display. It is also understood that this link list structure could be implemented through calculating the address required to read and write lines to the same location.

Figure 7:
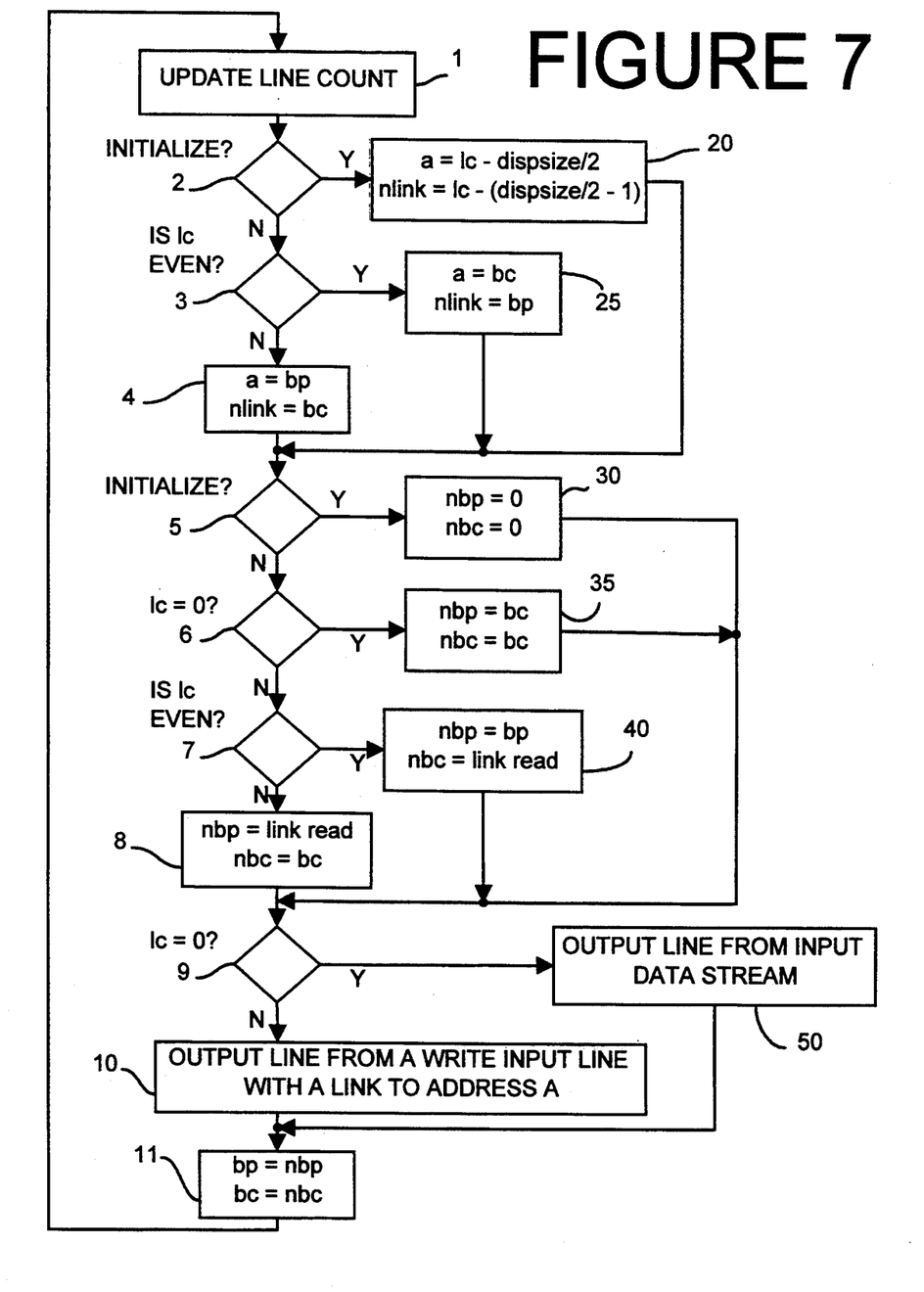
FIG. 7 is a flow chart of the operation of a linked list data structure in accordance with the present invention.

Referring now to FIG. 7, a flow chart depicting the operation of a link list data structure on the data stream is shown. In this implementation, the line count (1c) is updated step 1, then if the data structure needs to be initialized step 2, then the address (a) is equal to the line count minus the display size divided by 2, the new link nlink is located at a position one line higher than the address 20. If either of the above conditions is not met, step 3 then if line count is even the address is bc and the new link is bp 25; if line count is odd the address (a) is bp and the new link is bc step 4.

The following three decisions determine what the values of the bp and bc pointers become after the memory operation is completed. If the data structure needs to be initialized step 5, then nbp (next bp) and nbc (next bc) are each set to zero 30. Otherwise, if it is the first line of the display step 6, then both nbp and nbc are both set to the value of bc 35. If these two conditions are false, then one of two actions is taken: if the line count (1c) is even step 7, then nbp is set to the value of bp and nbc is set the line value read 40. Otherwise nbp is set to the link value read and nbc is set to bc step 8.

The final portion of the flow chart of FIG. 7 conditionally executes the memory access. If it is the first line of the frame step 9, then the current line from the CRT data stream is output and no memory access is made 45. For all other lines, the data is read from address (a) and the current line of data is written to the same address along with the new link (nlink) step 10. The last operation assigns the new values (nbp and nbc) to bp and bc step 11.

Hence, a particular linked list data structure is illustrated by FIGS. 5–7 is shown. One of ordinary skill in the art will readily recognize that many different types of link list structures could be utilized and that use would be within the spirit and scope of the present invention. In addition, it is understood that this linked list data structure could be implemented in a variety of ways. For example, the data structure could be implemented by calculating the appropriate address for each line. The data structure could also be implemented by a look-up table that is resident in the memory array.

Hence, numerous and various other arrangements can be readily devised in accordance with these principles by one of ordinary skill in the art without departing from the spirit and scope of the present invention and is limited only by the following claims:

We claim:

1. An apparatus for converting a cathode ray tube (CRT) data stream to multiple data streams, each one of the multiple data streams corresponding to one segment of a multiple segment display such that the display refresh rate of each segment of the display is equal to that of the CRT data stream, the CRT and multiple data streams including a plurality of lines that are utilized to provide a frame of data information, the apparatus comprising:

means for separating the CRT data stream into the multiple data streams, each of the multiple data streams containing the data required to refresh the corresponding segment in the display;

an array register means for receiving and storing one stream of the multiple data streams; and linked list data structure means for reading a line from the one stream of the multiple data streams from the array register means and then writing a line from the CRT data stream to the array register means, wherein a link is established between a last line written to the array register means from the CRT data stream and a next line to be read from the array register means to the display.

2. The invention of claim 1 further comprising means for periodically initializing the linked list data structure.

3. The invention of claim 1 further comprising:

means for storing a unique signature with each data line and means for initializing the linked list data structure when an incorrect signature is encountered.

4. The invention of claim 1 further comprising means for calculating the address for reading a line from one stream of the multiple data streams from one of the segments of the array register means and writing a line from the CRT data stream to any one of the segments of the array register means.

* * * * *